(12) United States Patent
Nagel

(10) Patent No.: US 7,324,895 B2
(45) Date of Patent: Jan. 29, 2008

(54) APPARATUS FOR CREATING A NAVIGATION MAP

(75) Inventor: Philipp Harald Nagel, Seevetal (DE)

(73) Assignee: Harman Becker Automotive Systems GmbH, Karlsbad (DE)

(*) Notice: Subject to any disclaimer, the term of this patent is extended or adjusted under 35 U.S.C. 154(b) by 664 days.

(21) Appl. No.: 10/037,303

(22) Filed: Nov. 7, 2001

(65) Prior Publication Data
US 2002/0169546 A1 Nov. 14, 2002

(30) Foreign Application Priority Data
Nov. 7, 2000 (DE) ............................. 100 55 156

(51) Int. Cl.
*G06F 7/38* (2006.01)
(52) U.S. Cl. .................... 701/208; 345/442
(58) Field of Classification Search ............ 701/207, 701/208, 200, 210, 212; 707/102, 104.1; 345/442, 441; 342/357.13
See application file for complete search history.

(56) References Cited

U.S. PATENT DOCUMENTS

| | | | |
|---|---|---|---|
| 3,783,294 A | 1/1974 | Koper | |
| 5,109,340 A | 4/1992 | Kanayama | |
| 5,566,288 A | 10/1996 | Koerhsen | 395/142 |
| 5,610,815 A * | 3/1997 | Gudat et al. | 701/23 |
| 5,724,072 A | 3/1998 | Freeman et al. | |
| 6,029,173 A * | 2/2000 | Meek et al. | 707/102 |
| 6,047,234 A | 4/2000 | Cherveny et al. | 701/200 |
| 6,268,825 B1 * | 7/2001 | Okada | 342/357.13 |
| 6,304,818 B1 * | 10/2001 | Kamiya | 701/200 |
| 6,314,341 B1 | 11/2001 | Kanayama | |
| 6,366,851 B1 * | 4/2002 | Chojnacki et al. | 701/208 |
| 6,366,927 B1 * | 4/2002 | Meek et al. | 707/104.1 |
| 6,438,494 B1 * | 8/2002 | Yamamoto et al. | 702/5 |
| 2003/0101036 A1 | 5/2003 | Nagel | |

FOREIGN PATENT DOCUMENTS

| | | | |
|---|---|---|---|
| DE | 41 24 654 A1 | 1/1993 | |
| DE | 19949698 | 4/2001 | 29/10 |
| EP | 0394517 | 6/1993 | 21/22 |
| EP | 0 789 225 A1 | 8/1997 | |
| EP | 1 045 224 | 10/2000 | |

* cited by examiner

*Primary Examiner*—Dalena Tran
(74) *Attorney, Agent, or Firm*—O'Shea, Getz & Kosakowski, P.C.

(57) ABSTRACT

To display a navigation map for a navigation device more accurately and realistically and with less memory capacity, roads, railroad lines, rivers, lakes, and similar cartographic parameters are composed not of straight lines but of Cornu spirals. A Cornu spiral is defined by its curvature and its length.

6 Claims, 2 Drawing Sheets

APPARATUS FOR CREATING A NAVIGATION MAP

BACKGROUND OF THE INVENTION

The present invention relates to the field of navigation systems, and in particular to a vehicle navigation system that stores map data using Cornu spiral data.

Conventional navigation systems typically represent roads and rivers to be displayed on a navigation system display unit as straight lines. However, this type of simplified cartographic reproduction has a number of disadvantages. For example, roads and rivers are not straight lines. As a result, a navigation map displayed on the navigation system display unit does not accurately represent the features of roads and rivers. In an attempt to more accurately represent roads and rivers, the number of straight line segments used to define the roads and rivers can be increased. However, this leads to a large increase in the amount of data that must be stored to accurately represent features such as roads, rivers and railroad lines.

Therefore, there is a need for a navigation system that accurately models and displays information indicative of features such as for example roads and rivers without requiring large amounts of memory.

SUMMARY OF THE INVENTION

Briefly, according to an aspect of the present invention, a vehicle navigation system includes navigation map data memory comprising map data composed of Cornu spirals indicative of cartographic features such as roads, railroad lines, rivers and lakes.

Rather than representing roads, railroad lines, rivers, and similar cartographic parameters by a sequence of straight lines, the present invention specifies that these cartographic parameters are provided as Cornu spirals.

In one embodiment, a vehicle navigation system that receives sensor data from a plurality of sensors, and provides a map image that is presented on a display, includes a navigation map data memory that includes map data indicative of roadways stored in Cornu spiral form. The system also includes a navigation processing unit that receives the sensor data, and requests map data from the navigation map data memory associated with the sensor data, and computes the map image from the map data.

Advantageously, the amount of memory required to store the parameters of the navigation map is reduced, while the accuracy of the navigation map is increased.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
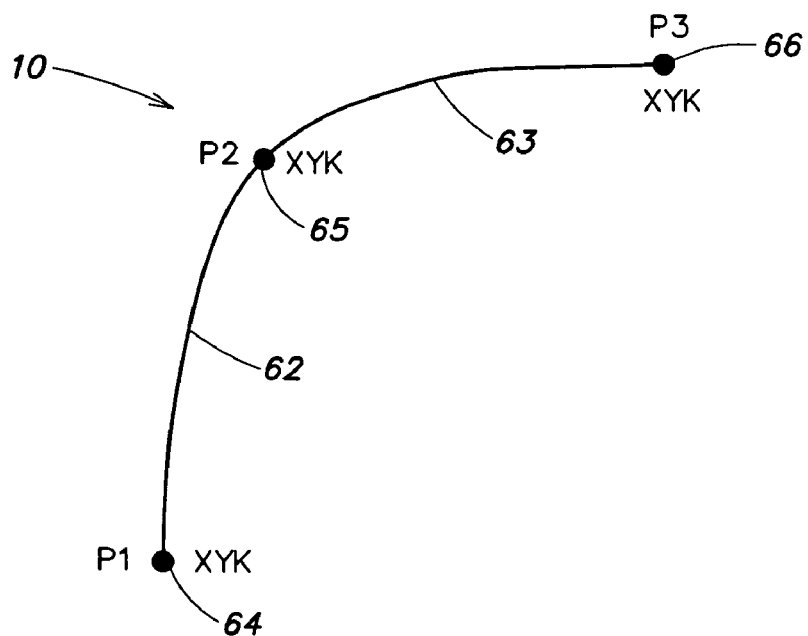
FIG. 1 is a pictorial illustration of a road in Cornu spiral representation.

FIG. 1 is a pictorial illustration of a road 10 in Cornu spiral representation. A Cornu spiral is defined as a curve whose curvature is proportional to its arc length. A Cornu spiral can be calculated by the following formula:

$$l = Ka^2 \qquad \text{EQ. 1}$$

where l represents the arc length and K the curvature. In parameter form, the equations of a Cornu spiral can be expressed as coordinates as follows:

$$x = a\sqrt{\pi} \int_{\tau=0}^{t} \cos\left(\frac{\pi}{2}\tau^2\right) d\tau \qquad \text{EQ. 2}$$

$$y = a\sqrt{\pi} \int_{\tau=0}^{t} \sin\left(\frac{\pi}{2}\tau^2\right) d\tau \qquad \text{EQ. 3}$$

with $t = \dfrac{l}{a\sqrt{\pi}}$

Since these integrals cannot easily be solved, an embodiment of the invention makes use of a Taylor series development, which can be expressed as follows:

$$X_k(t) = \qquad \text{EQ. 4}$$
$$a\sqrt{\pi}\left(\frac{1}{0!}\frac{\pi^0}{2^0}\frac{1}{1}t^1 - \frac{1}{2!}\frac{\pi^2}{2^2}\frac{1}{5}t^5 + \frac{1}{4!}\frac{\pi^4}{2^4}\frac{1}{9}t^9 - \frac{1}{6!}\frac{\pi^6}{2^6}\frac{1}{13}t^{13} + \ldots\right)$$

and $$Y_k(t) = \qquad \text{EQ. 5}$$
$$a\sqrt{\pi}\left(\frac{1}{1!}\frac{\pi^1}{2^1}\frac{1}{3}t^3 - \frac{1}{3!}\frac{\pi^3}{2^3}\frac{1}{7}t^7 + \frac{1}{5!}\frac{\pi^5}{2^5}\frac{1}{11}t^{11} - \frac{1}{7!}\frac{\pi^7}{2^7}\frac{1}{15}t^{15} + \ldots\right)$$

The series is truncated after a given term, so that a polynomial remains. The terms of the polynomials are preferably stored in a table.

Since all Cornu spirals are similar, there exists a unit Cornu spiral with parameter value a that is equal to one (i.e., a=1). In a preferred embodiment, the terms of the polynomials of the unit Cornu spiral are stored in a table and the actual Cornu spirals are calculated from these values. The coordinates of the unit Cornu spiral are stored in a table and the actual Cornu spirals are calculated from these values.

Compared to the conventional representation of roads by sequential straight lines, the present inventive provides a number of advantages. For example, the accuracy of the image is substantially increased, because an exact position exists not only at the points where two straight lines join, but rather over the course of the curve. The reproduction of roads, rivers, and the like is much more realistic. In addition, the representation of the indicated cartographic parameters by Cornu spirals requires fewer parameters than the prior art technique of using sequential straight lines. This saves considerable storage space in a navigation device that creates the inventive navigation map.

Because a navigation map with a Cornu spiral representation reproduces the actual pattern of roads and the like much more accurately than a representation with sequential straight lines, locations can be determined much better. Thus, for example, the route of a traveled road, measured by sensors, can be recovered more easily in a navigation map with a Cornu spiral representation, because the parameters can be calculated over the entire course of the curve.

A navigation map in Cornu spiral representation is suited both for navigation and for display. Consequently, a navigation device that creates the inventive navigation map no longer needs two navigation maps, as is the case in prior art systems. That is, in the prior art one of these two navigation maps is used for navigation, while the other is used for display.

Predictive route data describe the future route, for example for the next one to two kilometers. With a representation by Cornu spirals, predictive route data, for example, can be taken directly from the navigation map and are not required to be calculated online, which saves computing time.

In Germany, and also in other countries where geography permits, roads are constructed as Cornu spirals for the sake of higher traffic safety. As a result, the inventive representation of Cornu spirals is thus especially realistic. The quality of this representation approaches that of an aerial photograph.

Figure 2:
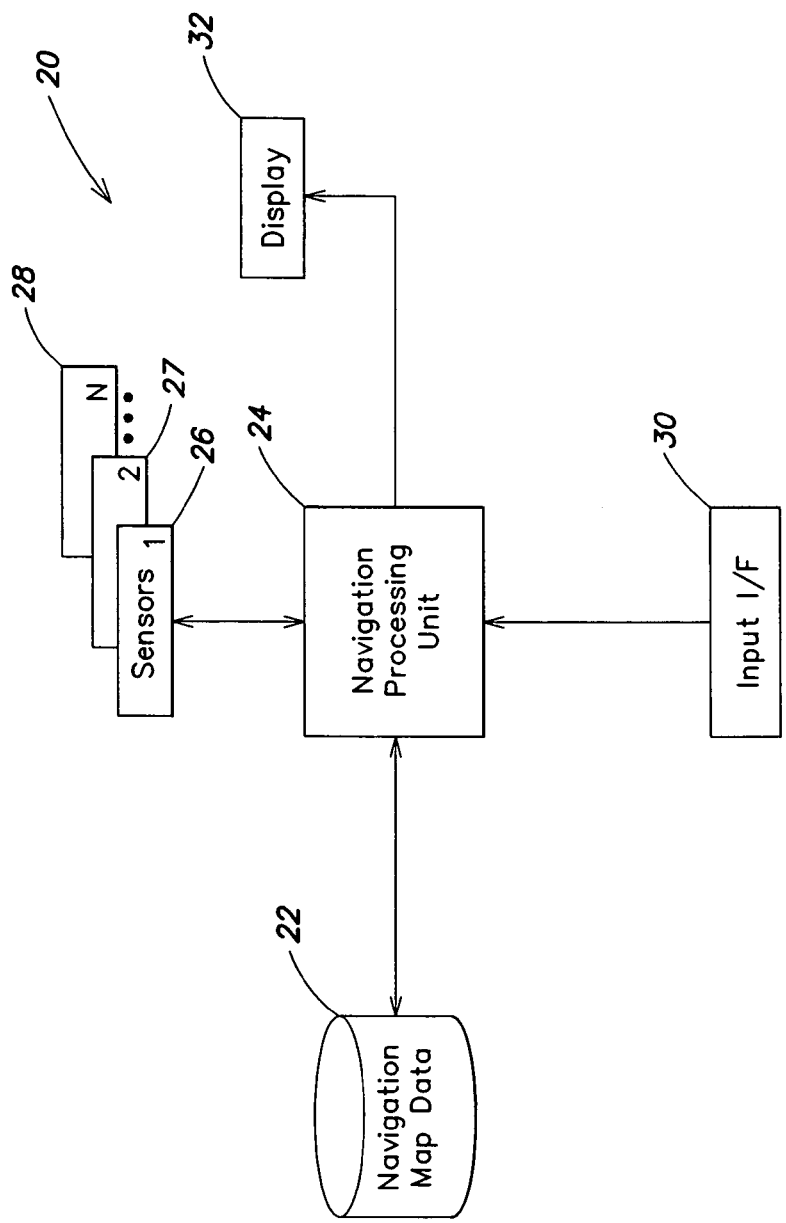
FIG. 2 is a block diagram illustration of a vehicle navigation system comprising a navigation map memory device that includes map data stored as Cornu spiral representations.

FIG. 2 is a block diagram illustration of a vehicle navigation system 20 comprising a navigation map memory device 22 that includes map data stored as Cornu spiral representations. The navigation system 20 also includes a navigation processing unit 24 that receives data from a plurality of sensors 26-28 and input commands from a user input interface 30. The components may be connected via a MOST bus. The system 20 also includes a display 32, which is used to display the navigation map and other navigation information. Significantly, the navigation map data memory 22 includes map data stored as Cornu spiral data.

Figure 3:
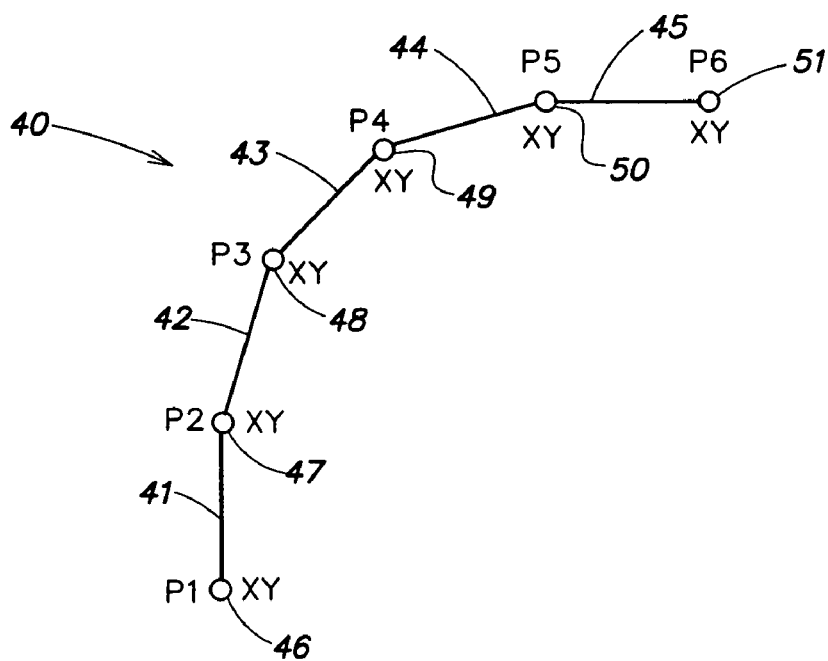
FIG. 3 is a pictorial illustration of the same road illustrated in FIG. 1, but represented by the prior art technique of straight line segments.

FIG. 3 is a pictorial illustration of the prior art technique for representing the same road as illustrated in FIG. 1. Specifically, a section of a road 40 is represented by five straight lines 41-44 and six points 46-51. In contrast, the same road illustrated in FIG. 1 is represented by two Cornu spirals 62-63 and three points 64-66. Despite using only two Cornu spirals and three points, the inventive representation illustrated in FIG. 1 is more accurate and realistic than the prior art representation with five straight lines and six points as shown in FIG. 3. The six points 46-51 illustrated in FIG. 3 require six x-coordinates and six y-coordinates, for a total of twelve coordinates. In contrast, referring to FIG. 1, the technique of the present invention requires the x- and y-coordinates of three points and the curvature K for the three points 64-66, for a total of nine coordinates.

Although the present invention has been shown and described with respect to several preferred embodiments thereof, various changes, omissions and additions to the form and detail thereof, may be made therein, without departing from the spirit and scope of the invention.

What is claimed is:

1. A vehicle navigation system that receives sensor data from a plurality of sensors, and provides a map image that is presented on a display, the system comprising:

a navigation map data memory that includes map data indicative of roadways stored in Cornu spiral form and data indicative of a unit Cornu spiral; and a navigation processing unit that receives the sensor data, and requests map data from the navigation map data memory associated with the sensor data, and computes the map image from the map data, where terms of polynomials of the unit Cornu spiral are stored in the navigation map data memory and the map image is computed using the terms of polynomials of the unit Cornu spiral, where the terms of polynomials are associated with Taylor series expressions indicative of the Cornu spiral, where the Cornu spiral is of the form $l=Ka^2$, where l is indicative of arc length and K is indicative of curvature.

2. A vehicle navigation system that receives sensor data from a plurality of sensors, and provides a map image that is presented on a display, the system comprising:

a navigation map data memory that includes map data indicative of roadways stored in Cornu spiral form and data indicative of a unit Cornu spiral; and a navigation processing unit that receives the sensor data, and requests map data from the navigation map data memory associated with the sensor data, and computes the map image from the map data, where terms of polynomials of the unit Cornu spiral are stored in the navigation map data memory and the map image is computed using the terms of polynomials of the unit Cornu spiral, where the terms of polynomials are associated with Taylor series expressions indicative of the Cornu spiral, where the navigation map data memory includes coordinates of the unit Cornu spiral stored in a table, from which the Cornu spirals of the navigation map are derived.

3. A vehicle navigation system that receives sensor data from a plurality of sensors, and provides a map image that is presented on a display, the system comprising:

a navigation map data memory that includes map data indicative of roadways stored in Cornu spiral form and data indicative of a unit Cornu spiral; and a navigation processing unit that receives the sensor data, and requests map data from the navigation map data memory associated with the sensor data, and computes the map image from the map data, where terms of polynomials of the unit Cornu spiral are stored in the navigation map data memory and the map image is computed using the terms of polynomials of the unit Cornu spiral, where the terms of polynomials are associated with Taylor series expressions indicative of the Cornu spiral, where the navigation map data memory includes coordinates of the unit Cornu spiral stored in a table, from which the Cornu spirals of the navigation map are derived for roads, railroad lines, rivers, lakes, and similar cartographic parameters defined as Cornu spirals.

4. A vehicle navigation system that receives sensor data from a plurality of sensors, and provides a map image that is presented on a display, the system comprising:

a navigation map data memory that includes map data indicative of roadways stored in Cornu spiral form and data indicative of a unit Cornu spiral; and means for receiving the sensor data, for requesting map data from the navigation map data memory associated with the sensor data, and for computing the map image from the map data, where the means for computing computes the map image using Cornu spiral polynomial coefficients stored in the navigation map data memory, and terms of polynomials of the unit Cornu spiral are stored in the navigation map data memory and the map image is computed using the terms of polynomials of the unit Cornu spiral, where the terms of polynomials are associated with Taylor series expressions indicative of the Cornu spiral and the Cornu spiral is of the form $l=Ka^2$, where l is indicative of arc length and K is indicative of curvature.

5. A vehicle navigation system that receives sensor data from a plurality of sensors, and provides a map image that is presented on a display, the system comprising:

a navigation map data memory that includes map data indicative of roadways stored in Cornu spiral form and data indicative of a unit Cornu spiral; and means for receiving the sensor data, for requesting map data from the navigation map data memory associated with the sensor data, and for computing the map image from the map data, where the means for computing computes the map image using Cornu spiral polynomial coefficients stored in the navigation map data memory, and terms of polynomials of the unit Cornu spiral are stored in the navigation map data memory and the map image is computed using the terms of polynomials of the unit Cornu spiral, where the terms of polynomials are associated with Taylor series expressions indicative of the Cornu spiral and the navigation map data memory includes coordinates of the unit Cornu spiral stored in a table, from which the Cornu spirals of the navigation map are derived.

6. A vehicle navigation system that receives sensor data from a plurality of sensors, and provides a map image that is presented on a display, the system comprising:

a navigation map data memory that includes map data indicative of roadways stored in Cornu spiral form and data indicative of a unit Cornu spiral; and means for receiving the sensor data, for requesting map data from the navigation map data memory associated with the sensor data, and for computing the map image from the map data, where the means for computing computes the map image using Cornu spiral polynomial coefficients stored in the navigation map data memory, and terms of polynomials of the unit Cornu spiral are stored in the navigation map data memory and the map image is computed using the terms of polynomials of the unit Cornu spiral, where the terms of polynomials are associated with Taylor series expressions indicative of the Cornu spiral and the navigation map data memory includes coordinates of the unit Cornu spiral stored in a table, from which the Cornu spirals of the navigation map are derived for roads, railroad lines, rivers, lakes, and similar cartographic parameters defined as Cornu spirals.

* * * * *